United States Patent Office 3,197,476
Patented July 27, 1965

3,197,476
METHOD OF SYNTHESIS OF 1-ACYL IMIDAZOLES
William E. Erner, Wilmington, Del., assignor to Air Products and Chemicals, Inc., Philadelphia, Pa., a corporation of Delaware
No Drawing. Filed Dec. 6, 1962, Ser. No. 242,626
4 Claims. (Cl. 260—309)

This invention is directed to the synthesis of 1-acyl imidazoles, such as 1-acetyl imidazole, by a new and effective method and to products synthesized by this method.

In the century of organo-chemical development since the discovery of imidazole in 1858 is has been recognized by Hoffman and Elderfeld (and numerous investigators), in treatises on imidazole, that this heterocyclic diaza compound is reactive in many ways, but is extremely resistant to acylation. This may be due to the fact that the imino-group in imidazoles possesses the acidic character associated with a pyrrole nitrogen and not the basic properties of the usual secondary imino-group. The acylation reaction is further inhibited by the tendency of imidazoles to undergo ring-splitting under the influence of acylating agents and alkalies. The Schotten-Baumann reaction, for example, does not result in the formation of 1-benzoyl imidazoles but effects fission of the imidazole ring to dibenzamido-ethylene. Similarly, the reaction of the Grignard derivative and benzoyl chloride results in ring fission.

Certain 1-acyl imidazoles have been synthesized by various carefully controlled methods from selected imidazoles. Boyer [J.A.C.S., 74, 4506 (1952)], for example, effected the reaction of 2-benzoyl-4(5)-phenyl imidazole with isopropenyl acetate to produce 1-acetyl-2-benzoyl-4-phenyl imidazole. However, it was also noted that benzimidazole, 2-methyl benzimidazole and 2,4,5-triphenyl imidazole were not successfully acylated with isopropenyl acetate. Later Boyer [J.A.C.S. 74, 6274-5 (1952)] succeeded in the synthesis of 1-acetyl imidazole from imidazole and isopropenyl acetate wth sulfuric acid as a catalyst. More recently Staab [Ang. Chemie Int. Ed. 7, 351 (1962)] obtained 1-acetyl imidazole by the reaction of two moles of imidazole with one mole or acetyl chloride, in which one mole of imidazolium chloride was produced at the same time. It is amply evident that 1-acyl imidazoles have only recently been synthesized with any semblance of success and then only by using high molal ratios of imidazole in an acidic system and under selected conditions.

The discovery of a simpler, more economical and practical process for the synthesis of 1-acyl imidazoles would be a substantially advance in the art. The synthesis of such compounds is particularly significant in that 1-acyl imidazoles are recognized as extremely powerful acylating agents active at room temperature with alcohols, amines, unsaturated hydrocarbons and the like. In effecting acylation, 1-acyl imidazoles release imidazole as a by-product rather than hydrochloric acid or acetic acid released on effecting acetylation wth acetyl chloride or acetic anhydride respectively. Thus, many sensitive compounds can be acylated with 1-acyl imidazoles which could otherwise not be acylated.

Accordingly, an object of the present invention is the synthesis of 1-acyl imidazoles by a new and practical method.

Another object of the invention is the direct synthesis of 1-acyl imidazoles in good yields at ambient temperatures.

Yet another object of the present invention is the preparation of non-acidic acylating agents highly active in acylation of alcohols, amines, olefins, and the like.

A further object of the invention is the acylation of imidazoles in the N—1 position while avoiding fission of the imidazole ring.

Yet a further object of the invention is the synthesis of 1-acetyl imidazoles by an addition reaction not requiring an acetyl halide or anhydride. Other objects and advantages of the invention will be apparent from the following description.

I have discovered that 1-acyl imidazoles are produced by the reaction of an imidazole having a free imino group and a ketene under ordinary temperatures and pressures. The reaction is preferably effected in the presence of a non-reactive solvent such as benzene or dioxane to obtain better temperature control. More specifically, with imidazole itself and ketene the reaction proceeds effectively at 40° C. in benzene to form 1-acetyl imidazole with no formation of byproduct acids and without splitting the imidazole ring.

Reactions of ketene with heterocyclic nitrogen compounds have been explored heretofore by several investigators with startlingly unproductive results as far as the production of 1-acyl derivatives is concerned. Hurd, for example [J.A.C.S. 61, 4267, (1939)] noted a reaction of ketene with pyridine in dioxane solution. Heat was developed and the reaction mixture turned yellow, then red. On cooling, a crystalline product appeared, melting at 199–200° C. which constituted less than 1% of the pyridine charged and was not further identified. In the same reaction the principal liquid product contained no combined nitrogen and was identified as dehydroacetic acid (a tetramer of ketene). Similarly, Berson [Berichte 67, 1675 (1934)] found that ketene reacted with pyridine but did not form an N-acyl pyridine.

Diphenyl ketene was reacted with pyridine by Berson [J.A.C.S. 78, 1625 (1956)] and after extensive separations and analyses the reaction product was identified as a complex bicyclic pyrono-dihydro-quinolazone which was unstable on warming, regenerating the addends, and on acid hydrolysis, regenerating pyridine and diphenyl acetic acid. It was accordingly a considerable surprise to find that ketene reacted readily with imidazole to form the 1-acetyl derivative and that substituted imidazoles and higher substituted ketenes reacted readily to form substituted 1-acyl imidazoles.

The process of the invention is, therefore, a versatile means of producing 1-acyl imidazoles, which constitute a group of acylating agents otherwise unobtainable or difficult to obtain, by the direct reaction of an imidazole having an available imino-hydrogen and a ketene, preferably in the medium of a nonreactive mutual solvent, at ordinary temperatures and pressures, as represented in the following equation:

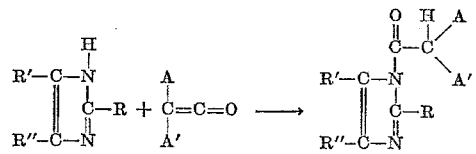

where R, R' and R" as well as A and A' are independently selected from the group consisting of hydrogen; methyl, or other lower alkyl groups of 1 to 5 carbon atoms; phenyl, or other aryl groups of 6 to 10 carbon atoms; benzyl, or other aralkyl groups of 7 to 12 carbon atoms.

In the synthesis of 1-acyl imidazoles practiced heretofore in which acyl halides or acid anhydrides have been used, or acid ester together with an excess of mineral acid, at least one molal excess of imidazole was required for reaction with the acid released during the syntheses. It was then necessary to treat the resulting salt, such as imidazolium chloride, acetate or sulfate, with at least the stoichiometric amount of base to free imidazole from the salt and recover the imidazole for reuse by distillation, extraction or other means, since the imidazole is far too expensive to discard as the salt.

In contrast to this, the acylation process of the present invention requires no excess imidazole to be converted to its salt and therefore requires no extensive processing for recovery of imidazole. Acetylation of imidazole with ketene is non-acidogenic, thus making the process applicable to compounds readily dissociated or attacked by acids. The invention is furthermore efficient and simple to operate. Working with volatile ketene ($CH_2=C=O$) boiling at $-56°$ C., or higher substituted ketenes, the reaction with imidazoles proceeds rapidly with a readily controllable exotherm to the desired 1-acyl derivative in near quantitative yields, which have not been obtained heretofore in any acetylation of imidazole. This synthesis is described in further detail in the following examples:

Example I

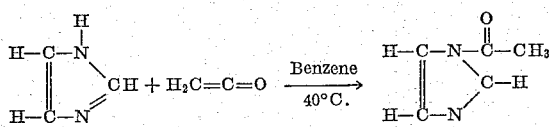

One mole of imidazole was dissolved in 300 ml. of benzene in a thoroughly dried 1-liter 3-necked flask by stirring and warming to 40° C. Ketene, evolved from acetone with the conventional ketene lamp [in the manner described by Williams and Hurd; J. Org. Chem. 5, 122 (1940)], was bubbled into the solution until one mole had been evolved. The resultant solution had a slight brownish cast. The solution was concentrated in a rotary evaporator and then chilled to precipitate 1-actetylimidazole at a yield of 93% of theory. The acetyl imidazole product, in the form of fine needles, melted at 97 to 99° C. and, on recrystallization from benzene, melted at 103–104° C. The product can be used directly as a solution in benzene to effect acylation of other organic compounds having an active hydrogen atom.

Ketene is also prepared by the pyrolysis of acetic acid or ethyl acetate and higher ketenes are made by well known procedures, generally of a more mild nature than the above pyrolysis, e.g., by the removal of hydrogen halide from an alpha halo acid halide with a tertiary amine or a metal such as zinc.

It has generally been observed that added alkyl substituents in a heterocyclic ring reduce the melting point quite sharply. For many low temperature reactions, liquid or low melting reagents are prefered. For such reactions, for example, the formation of 1-acetyl-2-methyl imidazole and higher substituted imidizole derivatives would be indicated.

Example II 2-methyl imidazole was reacted in a manner similar to Example 1:

400 ml. of benzene were used and in this case solution of the 2-methyl-imidazole was not immediate but progressed as ketene was added. The product, 1-acetyl-2-methyl-imidazole, upon recrystallization, melted at 32° C. It was obtained in 90% yield. 1-acetyl-2-methyl-imidazole is also more volatile than 1-acetyl imidazole and it has been recovered from the reaction product by vacuum distillation (sublimation) with the product obtained as fine needles melting at 32° C., as above.

Since imidazole or its substituents react very readily with ketene, the process of the invention can be used with considerable versatility in synthesizing 1-acyl imidazoles of the preferred melting point, molecular weight, composition and solubility.

Example III 224 parts by weight of 2-ethyl-4-methyl imidazole, a liquid at ambient temperatures, is warmed gently in a 3-necked flask and reactor system similar to Example I. To this, 360 ml. or 400 parts by weight of diphenyl ketene in 400 ml. of dry benzene are added slowly with rapid stirring. The reaction proceeds regularly with mild heat evolution until all the diphenyl ketene is added. The solution is then warmed and stirred to the point of refluxing benzene. The amber liquid product, principally 1-diphenylactyl-2-ethyl-4-methyl imidazole, is freed of a small amount of diphenyl acetic acid and unreacted diphenyl ketene present by washing twice with 10 ml. each of caustic methanol solution. The washed and neutralized product is distilled to remove a small amount of low boiling material and benzene, or the product in benzene solution is used effectively in acylating alcohols such as 2-ethyl hexanol, an 8 carbon OXO alcohol.

Example IV

Methyl ketene is prepared by a pyrolytic reaction in vapor phase, as in Example I above, using methyl ethyl ketone as the charge stock. A reactor similar to that above is charged with 190 g. of 2-(3-phenylpropyl)-imidazole. The reactor is warmed gently to melt the imidazole (M. Pt. 91° C.) and connected through to the discharge line of the ketene generator. Methyl ketene is passed through the stirred liquid until about 1.2 moles of methyl ketene are passed. Methyl ketene flow is cut off and the reactor warmed with stirring to about 100° C. Excess methyl ketene is removed with some low boiling byproducts under reduced pressure at 95–100° C. The 1-propionyl-2(3-phenyl-propyl)-imidazole having no diluent present is cooled and kept under reduced pressure until used to effect propionyl acylation.

In the preparation of a spectrum of 1-acyl compounds within the scope of the invention, imidazole and substituted imidazoles are required. While a vast number of such compounds have been described in the literature and any of several methods might be used in their synthesis, the following patents describe effective means for synthesizing such imidazoles or substituted imidazoles as may be desired for the process of the invention:

W. E. Erner, U.S. #2,847,417
H. A. Green, U.S. #3,037,028
Erner and Green, U.S. #3,050,520

Exemplary of such syntheses effected with selected imidazoles and ketenes are the following:

| Imidazoles | Ketenes | 1-acyl product |
|---|---|---|
| 2-methyl-4-phenyl-imidazole. | Ketene | 1-acetyl-2-methyl-4-phenyl imidazole. |
| Do | Methyl ketene | 1-propionyl-2-methyl-4-phenyl imidazole. |
| Do | Phenyl ketene | 1-phenacetyl-2-methyl-4-phenyl imidazole. |
| 2-ethyl-4-methyl-imidazole. | Ketene | 1-acetyl-2-ethyl-4-methyl imidazole. |
| Do | Dimethyl ketene. | 1-isobutyryl-2-ethyl-4-methyl imidazole. |
| Do | Phenyl ketene | 1-phenacetyl-2-ethyl-4-methyl imidazole. |
| 2,4,5-trimethyl imidazole | Ketene | 1-acetyl-2,4,5-trimethyl imidazole. |
| Do | Butyl pheny ketene. | 1-(2-butyl-2-phenyl acetyl)-2,4,5-trimethyl imidazole. |

Obviously, many modifications and variations of the invention as hereinbefore set forth may be made without departing from the spirit and scope thereof and therefore only such limitations should be imposed as are indicated in the appended claims.

What is claimed is:

1. The method of synthesizing 1-acyl imidazoles which consists essentially in reacting imidazoles having an available imino-hydrogen atom and ketenes characterized respectively by the formulas—

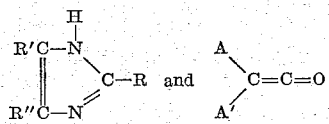

wherein R, R' and R'', as well as A and A', are independently selected from the group consisting of hydrogen, alkyl of 1 to 5 carbon atoms, aryl of 6 to 10 carbon atoms, and aralkyl of 7 to 12 carbon atoms.

2. The method of claim 1 wherein the imidazole and ketene are reacted at ambient temperatures and pressures.

3. The method of preparing active acetylating agents which consists essentially in reacting ketenes with imidazoles having an available imino-hydrogen atom characterized respectively by the formulas

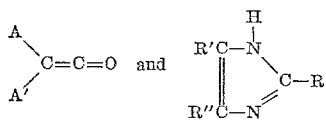

wherein R, R' and R'', as well as A and A', are independently selected from the group consisting of hydrogen, alkyl of 1 to 5 carbon atoms, aryl of 6 to 10 carbon atoms and aralkyl of 7 to 12 carbon atoms, in the medium of a non-reactive mutual solvent at ambient temperatures and pressures and recovering N-acetyl imidazoles as said acetylating agents.

4. A process for obtaining 1-acetyl-2-methyl imidazole which comprises reacting 2-methyl imidazole with at least the stoichiometric amount of ketene in a mutual non-reactive solvent at ambient temperature and pressure, separating the reaction product from unreacted ketene and 2-methyl imidazole and recovering 1-acetyl-2-methyl imidazole.

References Cited by the Examiner

Boyer: Jour. Amer. Chem. Soc., vol. 74, pages 6274–5 (1952).

Lacey: Ketene in Organic Synthesis In: Raphael et al., Advances in Organic Chemistry, vol. 2, pages 215, 218–219, N.Y., Interscience, 1960.

Motter et al.: Jour. Org. Chem., vol. 26, pages 2803–5 (1961).

Svetkin: Zhurnal Obshchei Khimii, vol. 27, pages 1676–79 (1957).

Svetkin: Zhurnal Obshchei Khimii, vol. 28, pages 711–12 (1958).

WALTER A. MODANCE, *Primary Examiner.*

NICHOLAS S. RIZZO, *Examiner.*